W. E. DE WITT.
PROJECTING APPARATUS.
APPLICATION FILED MAY 13, 1916.
1,229,908.
Patented June 12, 1917.
2 SHEETS—SHEET 1.
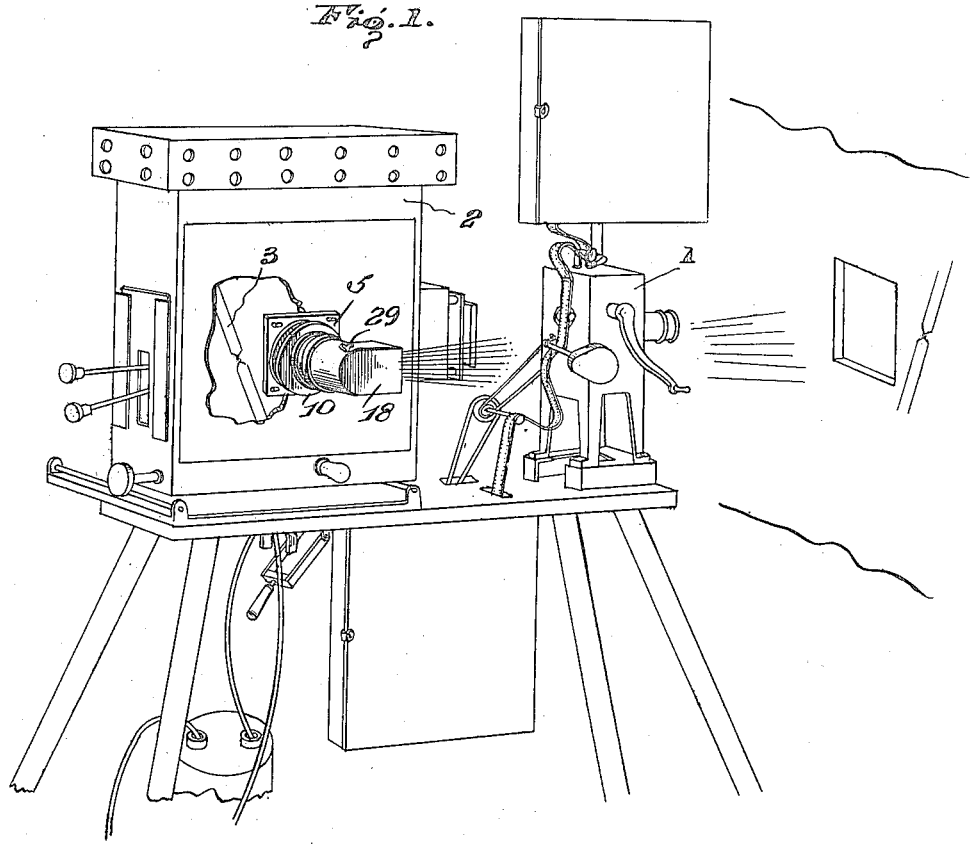
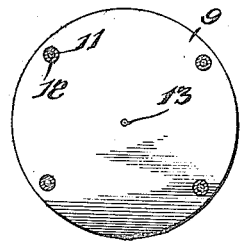
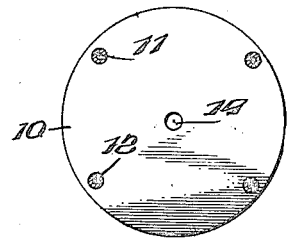
Inventor
W. E. De Witt.
By
[signature], Attorneys.

W. E. DE WITT.
PROJECTING APPARATUS.
APPLICATION FILED MAY 13, 1916.
1,229,908.
Patented June 12, 1917.
2 SHEETS—SHEET 2.
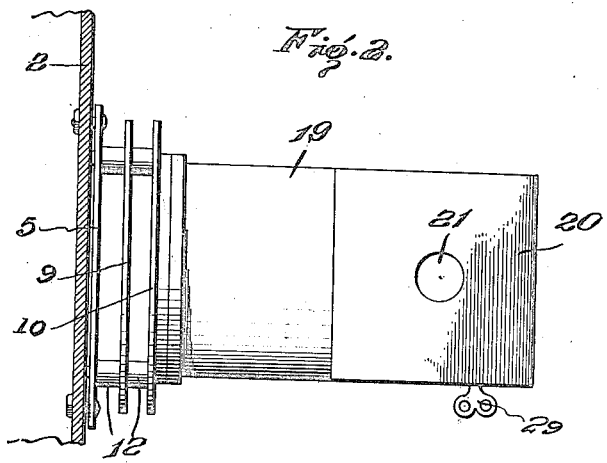
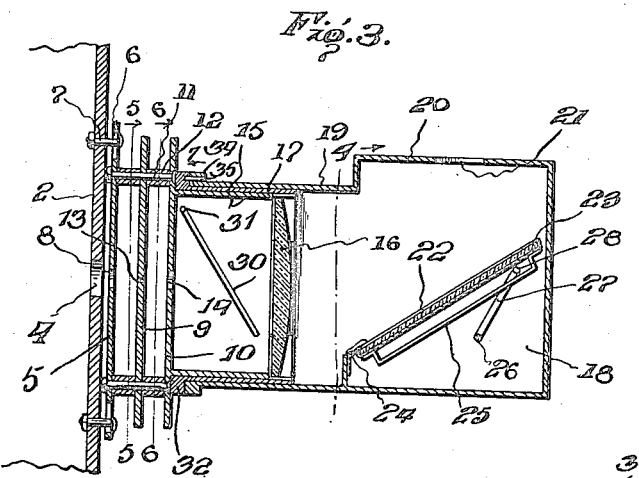
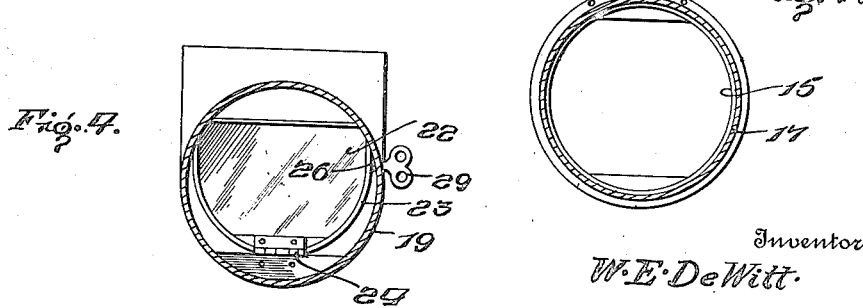
Inventor
W. E. DeWitt.
By
Attorneys.

UNITED STATES PATENT OFFICE.

WILBUR E. DE WITT, OF SALT LAKE CITY, UTAH.

PROJECTING APPARATUS.

1,229,908.            Specification of Letters Patent.      Patented June 12, 1917.

Application filed May 13, 1916. Serial No. 97,411.

*To all whom it may concern:*

Be it known that I, WILBUR E. DE WITT, a citizen of the United States, residing at Salt Lake City, in the county of Salt Lake and State of Utah, have invented certain new and useful Improvements in Projecting Apparatus, of which the following is a specification.

This invention has as its object to provide an apparatus whereby the condition of the carbons of an electric arc light may be observed without the necessity of looking directly at the arc, in doing which injury is likely to be caused to the eyes, and while the apparatus of the present invention is primarily designed for use in connection with the lamp house of a motion picture projection apparatus, it will be understood that the apparatus may be put to various uses wherever an inclosed electric arc light is employed.

It is one aim of the invention to provide an apparatus for the purpose stated which when properly assembled with the lamp house of a motion picture projection apparatus will project upon the wall, floor or ceiling of the operator's room or upon any surface especially provided for the purpose, an image of the arc and the two carbons so that the operator may readily observe the condition of the carbons without being required to look directly into the lamp house.

Another aim of the invention is to so construct the apparatus that the same may be adjusted so as to throw the image of the carbons upon the wall or other surface at any desired point so that the operator may adjust the apparatus in such manner that the image will be at all times directly in front of him or, if desired, the apparatus may ordinarily be so adjusted as to project the image upon the back wall of the operator's room and whenever desired may be thrown onto the front wall of the room or the ceiling or floor, thereby relieving the operator's eyes of the strain occasioned by having the image constantly before him.

In the accompanying drawings:

Figure 1 is a perspective view of the apparatus embodying the present invention assembled with the lamp house of a motion picture projection apparatus, the view also illustrating the manner in which the image of the carbons is to be projected upon the wall of the operator's room.

Fig. 2 is a front elevation of the apparatus.

Fig. 3 is a horizontal sectional view therethrough.

Fig. 4 is a vertical section on the line 4—4 of Fig. 3.

Fig. 5 is a vertical sectional view on the line 5—5 of Fig. 3.

Fig. 6 is a similar view on the line 6—6 of Fig. 3.

Fig. 7 is a similar view on the line 7—7 of Fig. 3.

In the drawings the numeral 1 indicates in general a motion picture projection apparatus of the ordinary type and the numeral 2 indicates the lamp house of the apparatus, a portion of the casing of the lamp house being broken away so as to show the carbons which are indicated by the numeral 3. At a point directly opposite the ends of the carbons, one side wall of the lamp house casing is formed with an opening 4 and the apparatus embodying the present invention is mounted upon this wall of the casing of the lamp house and the image of the ends of the carbons is projected by light rays passing through the opening 4 and through the apparatus as will be presently explained.

The apparatus embodying the present invention includes an attaching plate which is indicated by the numeral 5 and which may be rectangular as shown in the drawings, or of any other marginal contour and this plate is provided in its four corners with slots 6 through which and the side wall of the lamp house casing are passed attaching bolts 7. The plate 5 is provided centrally with an opening 8 located opposite the opening 4 in the side wall of the lamp house casing and it will be understood that by loosening the bolts 7 the plate may be adjusted forwardly or backwardly so as to bring the opening 8 therein directly opposite the ends of the carbons, such adjustment being usually required in the event of breakage of one of the condensing lenses which necessitates forward adjustment of the carbons. The numerals 9 and 10 indicate other plates which are disposed in planes parallel to the plane occupied by the plate 5, the plate 9 being located between the plates 5 and 10, as shown in Figs. 2 and 3 of the drawings, and the plates being held assembled by means of bolts 11 which are passed through all of the plates and which are provided with spacing sleeves 12 which serve to hold the plates properly spaced with relation to each other. The plate 9 is formed with an opening 13 which is smaller than the opening 8 in the plate 5, and the plate 10 is formed with an opening 14 which is slightly larger than the opening 13, all of the openings 8, 13 and 14 being axially in alinement. The numeral 15 indicates a tubular lens casing which projects from the outer face of the plate 10 and is in axial alinement with the opening 14 in the said plate and supported within this casing at its outer end is a lens or lens set 16. A supplementary casing 17 is rotatably and slidably telescopically fitted to the casing 15 and may be adjusted so as to vary the length of the said casing as a whole. The numeral 18 indicates in general a reflector casing which is provided with a cylindrical tubular extension 19 which telescopically fits the supplementary casing 17. The forward side of the reflector casing 18 is indicated by the numeral 20 and is formed with an opening 21 through which the image of the carbons may be projected from a reflector mounted within the said casing as will now be described.

The reflector above referred to is preferably in the nature of a mirror 22 mounted within a frame 23, the frame being hingedly mounted as at 24 within the casing 18 at a point adjacent the inner end of the tubular extension 19 of the said casing and being in this manner adapted for angular adjustment with relation to the forward wall 20 of the said casing. In order that the mirror may be angularly adjusted the casing 23 is provided upon its back with a guide 25 and a shaft 26 is rotatably fitted through the upper or under wall of the casing and has extending from it an arm 27 provided at its end with a finger 28 projecting into the guide 25. In order that the shaft 26 may be rotatably adjusted it is provided at its end which projects exteriorly of the casing with a finger piece indicated by the numeral 29. By reference to Fig. 3 of the drawings it will now be understood that the light rays from the arc are collected by the lens 16 and projected on to the reflector 22 from which they are reflected through the opening 21 in the forward wall 20 of the casing 18, an image of the carbons and arc being projected on to that wall of the operator's room toward which the wall 20 is presented. It will further be understood that not only may the tubular extension 19 of the casing 18 be adjusted with relation to the casings 15 and 17 to vary the distance between the lens 16 and the reflector 22, but also the casing 18 may be rotated so as to reflect the light rays forwardly, rearwardly, upwardly, or downwardly, as may be desired. It will also be understood that by adjusting the shaft 26, the mirror comprising the reflector 22 may be angularly adjusted with relation to the forward wall of the casing 18 so as to project the image of the carbons and arc a greater or less distance to one side of the plane of the lamp house.

It will be understood that by spacing the plates 5, 9 and 10, air may circulate freely and the device itself will, therefore, not become highly heated which would be likely to render adjustment inconvenient.

In order that the device may be conveniently and accurately focused, it is preferable that the lens casing 15 be formed with a diagonal slot 30 to receive the end of a screw 31 fitted through and carried by a flange 32 formed at the inner end of the supplementary casing 17, it being understood that by rotating the said casing 17 the end of the screw 31 will be caused to move in the slot 30, thereby moving the said casing 17 together with the lens or lens set carried thereby, inwardly or outwardly for the purpose stated. In order that the casing 18 may be properly held at adjustment so as to project the image of the arcs upon the walls, ceiling, or floor of the operator's room as may be desired by the operator, the flange 32 is formed with an annular series of sockets 33 located in its inner lateral face and the inner end of the tubular extension 19 of the casing 18 is provided with a flange 34 carrying a stud 35 adapted to be engaged interchangeably in the said sockets 33 for the purpose stated.

Having thus described the invention, what is claimed as new is:

1. In apparatus of the class described, an apertured plate, a lens casing extending from the plate, a lens mounted within the said casing and located opposite the aperture in the said plate, a reflector casing adjustably assembled with the lens casing, a reflector mounted within the reflector casing, and means for angularly adjusting the said reflector about the axis of the lens.

2. In apparatus of the class described, the combination with a casing housing an arc light and provided in one wall with an aperture, of an apertured plate supported upon the said wall in spaced relation thereto, the aperture of the plate being located opposite the aperture in the said wall of the casing, a lens casing extending from the said plate, a lens within the casing, a reflector casing adjustably fitted to the lens casing, and a reflector mounted within the reflector casing in position opposite the said lens.

3. In apparatus of the class described, the combination with a casing housing an electric arc light and provided in one wall with an opening, of a plate adjustably mounted upon the said wall of the casing and having an opening located opposite the opening in the said wall of the casing, a lens casing supported by the said plate, and a reflector mounted within the second mentioned casing opposite the lens, the said reflector being adjustable angularly about the axis of the lens.

4. In apparatus of the class described, the combination with a casing housing an electric arc light and provided in one wall with an opening, of a plate adjustably mounted upon the said wall of the casing and having an opening located opposite the opening in the said wall of the casing, a lens casing supported by the said plate, and a reflector mounted within the second mentioned casing opposite the lens, the reflector being angularly adjustable about the axis of the lens.

5. In apparatus of the class described, the combination with a casing housing an electric arc light and provided in one wall with an opening, of a plate adjustably mounted upon the said wall of the casing and having an opening located opposite the opening in the said wall of the casing, a lens casing supported by the said plate, a reflector mounted within the second mentioned casing opposite the lens, the reflector being angularly adjustable with relation to the lens and being provided with a guide, and an arm mounted for swinging movement and having a finger engaging the said guide.

6. In apparatus of the class described, a lens casing, a casing rotatably and slidably fitting the lens casing, one of the said casings being provided with a diagonal slot, a stud upon the other casing working in the said slot whereby to cause longitudinal adjustment of one casing with relation to the other upon rotation of one of the said casings, a casing having a portion rotatably fitting the second mentioned casing, a reflector mounted within the last mentioned casing and coacting means upon the second mentioned casing and the said portion of the last mentioned casing for locking the last mentioned casing with relation to the second mentioned casing.

7. In an arc projector, a lens casing for attachment to a wall of a lamp house, a reflector support mounted upon the said casing for adjustment rotatably about the axis of the casing, a reflector mounted upon the support, and means for adjusting the said reflector angularly independently of the rotative adjustment thereof.

8. The combination with a casing housing an arc light and provided in one wall with an aperture, of a lens casing mounted upon the said wall, a lens within the lens casing opposite the aperture, a reflector casing rotatably adjustably fitting the lens casing and provided in one wall with an opening, and a reflector mounted within the reflector casing opposite the said lens and the last-mentioned opening.

9. In an apparatus of the class described, a lens casing for attachment to a wall of a lamp house, a lens within the casing, and a reflector supported opposite the said lens and adjustable toward and from the same and also adjustable angularly with relation to the plane of the lens.

10. In an apparatus of the class described, a plate, means for attaching the plate to a wall of a lamp house, a plurality of plates supported in planes parallel to the plane occupied by the first-mentioned plate, all of said plates being spaced whereby to provide open sided cooling chambers, the said plates being provided with alined apertures, and a lens casing carried by the outermost one of the plates.

11. In an apparatus of the class described, the combination with a casing housing an arc light and provided in one wall with an aperture located opposite the said light, of a lens casing mounted upon the said wall opposite the aperture, a lens within the casing, a casing rotatably fitting the lens casing, co-acting means upon the lens and second-mentioned casing for moving the second-mentioned casing longitudinally upon the lens casing when rotated thereabout, a reflector casing rotatably adjustable upon the second-mentioned casing, and a reflector mounted within the said reflector casing opposite the said lens.

In testimony whereof I affix my signature.

WILBUR E. DE WITT. [L. S.]